(12) United States Patent
Powell

(10) Patent No.: US 7,106,174 B1
(45) Date of Patent: Sep. 12, 2006

(54) ANTI-COLLISION TAG APPARATUS AND SYSTEM

(75) Inventor: George Leonard Powell, Canning Vale (AU)

(73) Assignee: Hanex Co., Ltd., Tokyo (JP)

( * ) Notice: Subject to any disclaimer, the term of this patent is extended or adjusted under 35 U.S.C. 154(b) by 0 days.

(21) Appl. No.: 09/719,958

(22) PCT Filed: Jun. 22, 1999

(86) PCT No.: PCT/GB99/01964

§ 371 (c)(1),
(2), (4) Date: Mar. 23, 2001

(87) PCT Pub. No.: WO99/67735

PCT Pub. Date: Dec. 29, 1999

(30) Foreign Application Priority Data

Jun. 22, 1998 (GB) .................................. 9813371.3

(51) Int. Cl.
*H04Q 5/22* (2006.01)

(52) U.S. Cl. .................... 340/10.2; 340/10.1; 340/10.3; 340/10.32; 340/10.4; 340/10.42; 340/10.41; 340/10.5; 340/825.69; 340/825.72; 340/825.53

(58) Field of Classification Search ............... 340/10.2, 340/10.3, 10.32, 10.4, 10.42, 825.52, 10.1, 340/825.69, 825.72, 825.53, 10.41, 10.5; 455/101; 327/205
See application file for complete search history.

(56) References Cited

U.S. PATENT DOCUMENTS

| | | | | |
|---|---|---|---|---|
| 4,433,256 A | * | 2/1984 | Dolikian | 307/358 |
| 4,691,202 A | | 9/1987 | Denne et al. | 340/825.54 |
| 5,339,073 A | * | 8/1994 | Dodd et al. | 340/825.31 |
| 5,345,231 A | | 9/1994 | Koo et al. | 340/870.31 |
| 5,856,788 A | * | 1/1999 | Walter et al. | 340/825.54 |
| 5,942,977 A | * | 8/1999 | Palmer et al. | 340/572.5 |
| 6,046,683 A | * | 4/2000 | Pidwerbetsky et al. | 340/825.54 |
| 6,323,566 B1 | * | 11/2001 | Meier | 307/10.2 |
| 6,466,771 B1 | * | 10/2002 | Wood, Jr. | 455/101 |

FOREIGN PATENT DOCUMENTS

EP  0 702 324 A2  11/1995

OTHER PUBLICATIONS

PCT/ISA/210, International Search Report, Application# PCT/GB99/01964, Aug. 10, 1999.
PCT/ISA/210, PCT International Search Report, Application# PCT/GB99/01964, Aug. 10, 1999.

* cited by examiner

*Primary Examiner*—Brian Zimmerman
*Assistant Examiner*—Vernal Brown
(74) *Attorney, Agent, or Firm*—Bromberg & Sunstein LLP

(57) ABSTRACT

This invention relates to radio frequency identification (RFID) apparatus comprising a reader/writer and transponders (tags) such that 2 or more transponders are capable of operating simultaneously in the same field so that information in the form of data bits may be received from or sent to the tags without corruption.

23 Claims, 2 Drawing Sheets

*Note. The amount of modulation from tags is exaggerated. Typical modulation may be too small to be shown.

ANTI-COLLISION TAG APPARATUS AND SYSTEM

This application claims priority from United Kingdom patent application serial number 9813371.3, filed Jun. 22, 1998.

The present invention relates to radio frequency identification (RFID) apparatus comprising a reader/writer (later referred to as a 'reader') and transponders (tags).

Such apparatus forms the basis of a radio frequency tagging system, where the number of tags within the field that may be read is limited only by the number of unique combinations of bits used to define a code to identify each tag. Alternatively, two or more tags may define a set with the same combination or part combination of bits and these may be selected simultaneously. Such may be the case when deliberately sending data to tags of the same combination or part combination for the purposes of writing to them or disabling them or otherwise addressing them to modify their functionality.

In operation, an RFID reader will attempt to communicate with one or more RFID tags within the reader's transmission area. The reader transmits a predetermined signal (hereafter referred to as a "field") and then monitors the signal. The tags responding to the signal modulate it in a predetermined manner which is identified by the reader. However, if there are a number of tags within the transmission area it is difficult and time consuming to identify individual tags, communicate with only one tag and even to decrypt their responses to the transmitted signal.

Previous systems have mostly tried to achieve anti-collision of the signals modulated by the tags by incorporating some means to 'talk' to single tags, for example, by binary selection, sometimes by using randomness and helped by the slightly differing times that the tags are introduced into the area, or by beaming (directional control) of the field or by modification of the field or alternatively by use of complicated algorithms to decrypt overlay data.

These systems are typically hindered by more than one tag 'talking' at the same time.

In the past systems have attempted to decrypt overlaying data caused by multiple tags 'talking' at the same time or have relied on random transmissions to separate signals in the time domain or have used a field beam or conduct a time consuming binary search to isolate individual tags. Often tags need to be read twice or even 3 times to confirm there has been no data error.

Such a system is disclosed in European patent application number 95112673.9. A tree splitting algorithm is used to identify a tag in a field. Where all tags respond simultaneously, they interfere with each others transmission and the base station receives corrupted data. The tree splitting algorithm organizes and sequences the transmission from tags via a random number generator so that the base station receives data in an orderly manner that is not superimposed and therefore corrupted.

According to an aspect of the invention, there is provided a radio frequency tag apparatus comprising a plurality of tags and a transceiver for sending information to, and simultaneously receiving information from, a plurality of tags without corruption, wherein each tag is allocated an identification word comprising a predetermined number of bits, the tags comprising means for selectively modulating a signal received from the transceiver, and the transceiver comprising means for sending an interrogation signal comprising a plurality of portions, wherein each portion is associated with a predetermined bit, or bit sequence, of the identification words used to simultaneously interrogate, substantially at the same time, the tags to identify, in response to modulated signals provided by the tags, the presence of a tag or tags having a given value at the predetermined bit or bit sequence.

According to another aspect of the present invention, there is provided a method of detecting the presence of tags within a target area by sending interrogation signals from a transceiver for selective simultaneous modulation by tags present in the target area, each tag being allocated an identification word comprising a predetermined number of bits, the method comprising: sending from a transceiver an interrogation signal comprising a plurality of portions, each portion being associated with a predetermined bit or bit sequence of the identification words and being capable of conveying a given value for the bit or sequence of bits, wherein tags having the value at the predetermined bit or bit sequence are configured to modulate the signal, the modulation being used to identify the presence of those tags.

According to a further aspect of the present invention, there is provided a radio frequency tag identification system comprising a receiver/transmitter and transponders which are adapted to start communication at the same time and to be simultaneously interrogated and progressively eliminated from interrogation.

The present invention is directed to an alternative way of interactively isolating tags in a way that is highly efficient and very fast.

Operation is such that two or more transponders are capable of operating simultaneously in the same field in such a manner that information in the form of data bits may be received or sent to the tags without corruption. This has come to be known as anti-collision.

In contrast to previous systems, the present invention will not work unless the tags are allowed to 'talk' at the same time and uses positively 'collision' rather than trying to avoid it.

Moreover, the system of the present invention described is self-checking. Not only does the reader check the tag output but the tag also checks the reader output, and will drop out in the case of an error. This self check means the tag need only be read once and is secure.

The invention will now be described by way of example only, with reference to accompanying figures.

Figure 1:
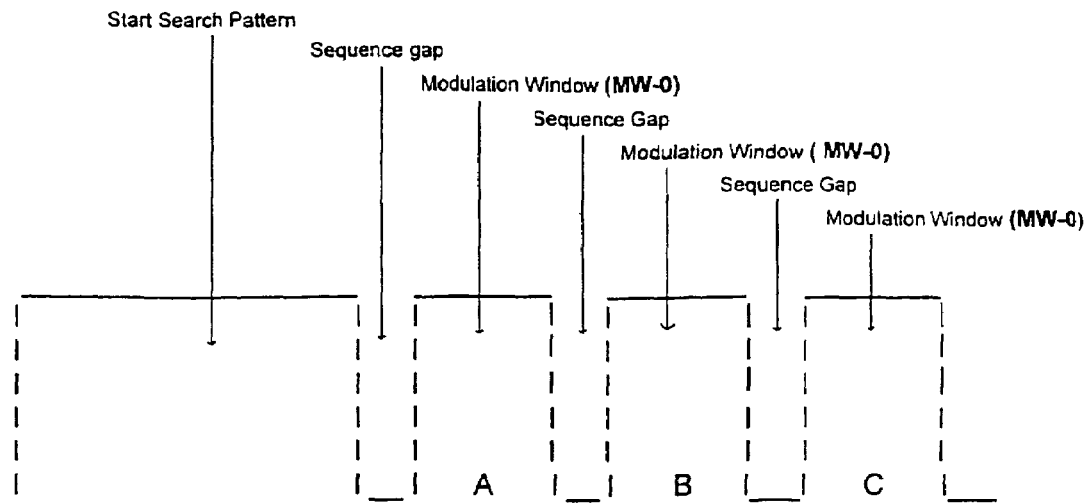
FIG. 1 is a data bit stream for use in an apparastus in accordance with the invention.

In an embodiment of the invention all active tags are requested to start communicating at the same time, forming a 'collision' and are simultaneously interrogated and progressively eliminated. Communications from the tags are synchronised by, in this case, a search pattern, but this may be by any other form of synchronisation. Tags that do not receive a valid search pattern do not send data at all.

The invention might be better thought of as Synchronised Collision. It is normal for a reader to communicate to the tag using 100% modulation of the field. To start a search pattern, the reader transmits a data pattern called a 'Start Search Pattern'. This is understood by all tags as a start search command. There is another pattern known as a 'New Sweep Pattern' which signals a new sweep within the overall search. Each sweep represents a single interrogation of the tags winthin reach and a number of sweeps equal to the number of tags plus one are needed to identify the presence of each individual tag. A search will generally consist of as many sweeps as there are tags in the field and an additional final sweep that may be aborted when no tags respond. The above "start search" and "new sweep" patterns in this example are detected by their duration but may be any compatible distinguishable pattern.

Tags are only allowed to participate in a search if they have received a 'Start Search Pattern'. This among other things, prevents late arrivals from disrupting the search. After the valid reception of a start search pattern, the tag is said to go active. The reader next transmits the interrogation pulse sequence. In this embodiment, the length of the pulse determines the binary value of the interrogation pulse, but alternative encoding schemes such as pulse code modulation may be used. The tag employs amplitude modulation, however, alternative methods such as phase shift keying may be used.

A 'search' will consist of a number of 'sweeps'. Each sweep will select an individual tag or set of tags sharing the same address. A normal sequence of a search of tags of different addresses will be shown below. Three states are referred to. These are 'Active' in which case the tag will participate in the search. 'Quiescent' in which case the tag is waiting for another sweep, and 'Inactive' in which case the tag has either not received a 'Start New Search' pattern or has already participated in a search and been eliminated (written to and/or read).

The sequence of steps for identifying tags in a field is as follows;

(a) A 'Start Search Pattern' is transmitted by the reader to alert all tags in the field that a search is to follow:—all tags in range go 'active'.

(b) A sequence of interrogation pulses (portions) corresponding to the number of bits, or sequences of bits, of the tag identification word, or else a reduced number if a set is to be identified, is sent out by the reader to which active tags interactively respond and all but 1 tag (or a set of tags sharing an identical address) is eventually eliminated. Data may be written to any tag/tags selected. Any tag so selected will then go inactive until the next 'Start Search Pattern'. Tags failing to be selected on a bit by bit (or bit pattern by bit pattern) basis go quiescent the moment they fail such an interrogation.

(c) A 'New Sweep Pattern' is transmitted by the reader—all tags in the quiescent state go active again. Tags that have not received a 'Start Search Pattern' or have already been selected (read) remain inactive.

(d) The reader loops back to 'b' above. At n+1 loops the reader detects no further tag interaction and ends the current search.

After transmission of a 'Start Search Pattern' the reader sends out a pulse. As the pulse duration increases, it passes through a period in time named the 0 modulation window (MW-0) in which all active tags which have a 0 in the first bit position must reply by turning on their modulator thus modulating the field. In the absence of a detectable response the reader will continue the duration of the pulse. As the pulse duration increases it passes through another period named the 1 modulation window (MW-1) in which all active tags which have a 1 in the first bit position must reply by turning on their modulator thus modulating the field. (Later it will be explained how bit patterns (such as 00,01,10,11) can be substituted for the individual bits.)

An example of a start search pattern followed by the transmission of three MW-0 windows, as transmitted by a reader, is shown in FIG. 1.

In this embodiment, a tag will always be asked if its next bit is a 0 before it is asked if its next bit is a 1. Where more than one tag replies by modulating the field at the same time, the modulation of the field is increased. Logic within the reader will normally, upon the detection of modulation appearing in a MW-0 window, not extend the pulse to transmit a MW-1 modulation window. Where the MW-1 modulation window is not transmitted, any active tag that has a 1 in that position is programmed to go quiescent until a 'New Sweep Pattern' is received. In the instance that no active tag has a '0' in this position, the reader will extend the pulse up to the '1' position and all the active tags with a '1' in this position will remain active. The gap between the reader pulses is used by the tag to sequence the progress through the bits. The reader transmits the next interrogation pulse and so on. In this way the reader can conduct a highly efficient binary elimination, such that it needs only a 'Start Search Pattern' or a 'New Search Pattern' followed by as many pulses as there are bits in the tag type.

In this embodiment no distinction is made between tag data and the tag address. Tag data, if present, may be placed at the end of a tag address or alternatively in addressable blocks. Once a single tag has been isolated, the same process could be repeated to read any tag data, if present, however once the possibility of collisions has been eliminated, tag data can then be read in a more conventional way such as Manchester encoding or Phase shift modulation. The key point in this invention is the self checking 'anti-collision' method of isolating a single tag (or set of tags of the same address or part address) by the method described.

A tag may receive a start search pattern or a new sweep pattern and participate yet be out of the read range of the reader. In this instance the tag itself detects an apparent inconsistency in the reader transmissions. For example a tag which has just modulated a 0 window will expect the pulse to terminate instead of going on to the 1 modulation window. In this case the tag will go quiescent and wait for a new sweep pattern. This is a self-check and is a system advantage.

When a single tag or set of tags has been successfully isolated and identified, the reader may also write data to it (assuming the tag has EEROM or EPROM). Once read, the tag may be pre-programmed to remain silent until either the field is removed or it receives a new 'Start Search Pattern'. The reader will usually next transmit a 'New Sweep Pattern' and continue reading and eliminating tags until none remain. The 'New Sweep Pattern' wakes any tag in the 'quiescent state' that has been eliminated, but not read, from a previous sweep, allowing it to participate in the next sweep. Each sweep will normally identify a unique tag hence there will usually be as many sweeps as there are tags in the field, and a last sweep that will produce no results and may be aborted early.

The reader begins by sending a search pattern. The reader next starts to transmit a pulse. If no tag modulates the 0 window of the pulse, the reader will deduce that there is no active tag in the field that has a 0 in the first bit position. In this case the reader would continue the pulse to include a 1 modulation window. Any tag in the field with a 1 in this position will start modulating in this window and will continue to be active. In the instance of the first bit, if neither window is modulated the reader will deduce that there is no tag in range.

Assuming the first bit is modulated in the 0 modulation window (MW-0) and the reader stopped the pulse before the 1 modulation window, any tag with a 1 in this position will go quiescent until either a 'New Sweep Pattern' or a 'Start Search Pattern' is received. The reader continues onto the second bit and so on until it gets to the last bit position and an individual tag (or set of tags) has been isolated. After a tag has been identified and eliminated the reader will start a new sweep. (The significance of mentioning a 'set of tags' lay in the possibility that a special set of tags can be switched off, or if the facility allows, be written to, or otherwise made to perform in a special way. A further type of reader modulation may be inserted—say by a pulse extending beyond the 1 modulation window or an extra mini pulse—to let the set know it has been selected.)

In this fashion the reader will detect a 64 bit tag every 64 bit pulses (not including the 'Start Search Pattern and the 'New Sweep Patterns'). This is a highly efficient algorithm.

Figure 2:
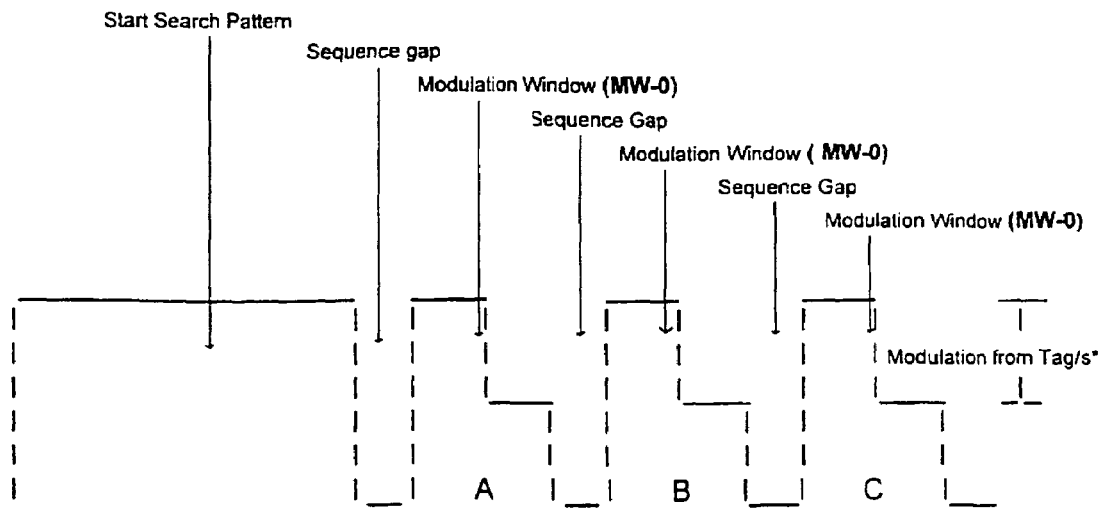
FIG. 2 is another data bit stream for use in an apparatus in accordance with the invention.
Figure 3:
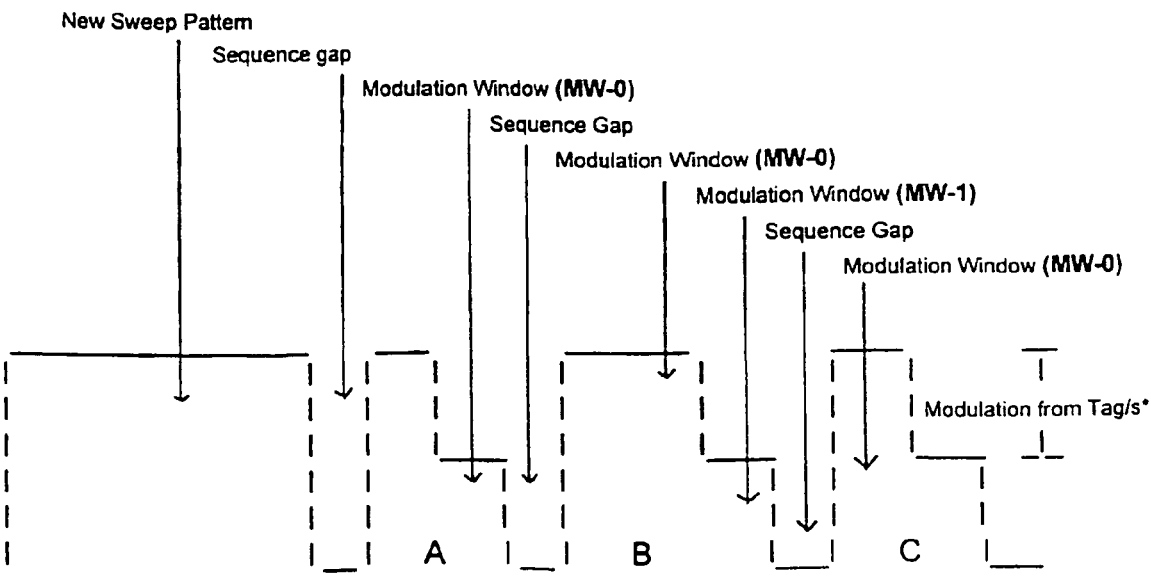
FIG. 3 is another data bit stream for use in an apparatus in accordance with the invention.

FIGS. 2 and 3 show a received signal at the reader, in response to a signal transmitted by the reader and modulated by tags.

Referring to FIG. 2, it will be seen that pulses A, B and C have all been modulated in the '0' modulation window (MW-0). This is represented by the fall in the signal level following the MW-0 signal. This shows that there is at least one active tag in the field having a '0' in the first three bit positions. The 'Start Search Pattern in FIG. 1 is shown as a long pulse by example. In practice a long break in the field is more usual. This resets all tags.

In FIG. 3, it will be seen that the first pulse (A) has been modulated by at least one tag which has a '0' in the first position. The second interrogating pulse (B) shows that no active tags have a '0' bit in this position. As a consequence the reader has continued the pulse to allow active tags with a '1' in this position to respond and modulate the '1' modulation window and stay active. In this way tags are progressively read and eliminated.

In this embodiment modulation of the field by the tags is amplitude modulated (ASK) but phase modulation (PSK), frequency modulation (FSK) or any detectable form of modulation may be employed.

In this embodiment individual bits have been interrogated for simplicity, although bit patterns can be interrogated such as 00, 01, 10 or 11 and so on. In the instance of the following bit patterns, 00,01,10,11 this can be achieved by using 4 possible modulation windows representing the 4 possible combinations. The operation will be then carried out as before. The first modulation window could be 00. Any active tags having this bit pattern at this stage of the prosecution of the interrogation will be required to modulate this window and remain active. This will eliminate tags having bit patterns 01,10 and 11. Should no tags have a 00 pattern then the reader will extend the pulse to include the next modulation window and so on as in the case of detecting '0' and '1' bits. Because the reader need not modulate the field as many times, there is some speed advantage. As the bit pattern is increased beyond 2–3 bits it will be increasingly more difficult extract a speed advantage and if the bit pattern is made still larger the overall speed will eventually diminish.

Figure 4:
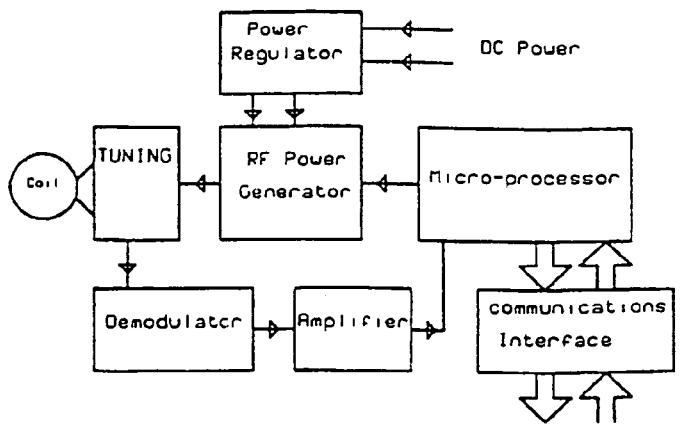
FIG. 4 is a block diagram of an RFID 'reader' for use in an apparatus in accordance with the invention.
Figure 5:
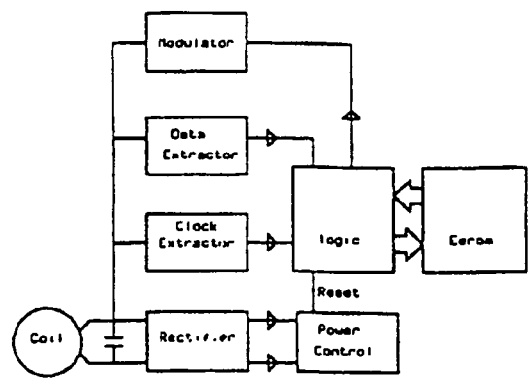
FIG. 5 is a block diagram of an RFID 'tag' for use in an apparatus in accordance with the invention.

FIGS. 4 and 5 are block diagrams of conventional apparatus configured for use in the present invention.

The invention claimed is:

1. A radio frequency tag identification system comprising a plurality of tags and a transceiver for sending information to and receiving information from the tags, wherein each tag is allocated an identification word comprising a predetermined number of bits, the tags comprising means for selectively modulating a signal received from the transceiver and transmitting the modulated signals back to the transceiver, and the transceiver comprising means for sending an interrogation signal comprising a plurality of portions, wherein each portion of the interrogation signal has two possible signal formats, in the form of pulses having different durations, and the format used for a given interrogation signal portion is determined by the transceiver in dependence on modulated responses received from the tags during the transmission of the said given interrogation signal any previous portion, wherein each portion is associated with a predetermined bit, or bit sequence, of the identification words and is used to simultaneously interrogate the tags to identify, in response to modulated signals provided by the tags in response to the predetermined bit or bit sequence, the presence of a tag or tags having a given value of the identification word at the predetermined bit or bit sequence, wherein each tag is deactivated when not having said given value of the identification word at the predetermined bit or bit sequence.

2. A system as claimed in claim 1, the transceiver further comprising, an antennae array, a radio frequency transponder, an external data communication port and an energising source.

3. A system as claimed in claim 2, wherein the transceiver generates modulated radio frequency power for application to the antennae.

4. A system as claimed in claim 1, including in each tag an inductive loop antennae or capacitor plates that will convert the electric power into an electric field to communicate with transponders and provide the power for transponders where this power is not derived internally within the transponder from internal batteries or a light cell.

5. A system as claimed in claim 1, including in each tag an antenna that will convert the signal power from the transceiver into an RF field to communicate with transponders.

6. A system as claimed in claim 1, the transceiver including means for determining the nature of the modulation based on the logical outcome of previous communications with tags to conduct a binary search.

7. A system as claimed in claim 1, the transceiver including means for detecting the modulation impressed on the field by any tag comprising a demodulator and an amplifier, wherein the modulation signal is sent to a processor in a logic block and is digitised within a logic processor and evaluated.

8. A system as claimed in claim 1, the tag or tags comprising signal pickup means, a rectifier, a clock extractor, a data extractor, a modulator and a logic section.

9. A system as claimed in claim 8, in which the signal pickup means comprises a pickup coil.

10. A method of detecting the presence of tags within a target area by sending interrogation signals from a transceiver for selective modulation and transmission back to the transceiver by tags present in the target area, each tag being allocated an identification word comprising a predetermined number of bits, the method comprising:

sending from a transceiver an interrogation signal comprising a plurality of portions, each portion of the interrogation signal having two possible signal formats, in the form of pulses having different durations, and the format used for a given interrogation signal portion being determined by the transceiver in dependence on modulated responses received from the tags during the transmission of the said given interrogation signal portion, each portion being associated with a predetermined bit or bit sequence of the identification words and being capable of conveying a given value for the bit or sequence of bits, wherein tags having the value at the predetermined bit or bit sequence are configured to modulate the signal and transmit the modulated signal back to the transceiver, the modulation being used to identify the presence of those tags, and wherein each tag is deactivated when not having said given value of the identification word at the predetermined bit or bit sequence.

11. A method as claimed in claim 10, wherein the presence of a tag or tags having an individual identification word is detected by sending an interrogation signal having portions corresponding to all bits of the identification words.

12. A method as claimed in claim 10, wherein each portion comprises a first part which is used to interrogate the tags to determine whether in a tag or a plurality of tags the associated bit or sequence of bits has a first value, and a second part which is used to interrogate the tags to determine whether the associated bit or sequence of bits has a second value.

13. A method as claimed in claim 12, wherein if a portion is used to interrogate the tags to determine whether in a tag or a plurality of tags the associated bit or sequence of bits having the first value, the first part is sent, and if the portion is used to interrogate the tags to determine whether the associated bit or sequence of bits has a second value, the first and second parts are sent.

14. A method as claimed in claim 13, wherein only if there is no response to the first part is the second part sent.

15. A method as claimed in claim 10, wherein a tag not having the value at the predetermined bit or bit sequence ignores further signals until an activation or a wake signal is received.

16. A method as claimed in claim 10, wherein data bits of a tag transponder are read from and/or written to by sending further bits after the interrogation signal, wherein tag then deactivates and ignores further signals until an activation signal is received.

17. A method as claimed in claim 10, whereby a tag can determine if the reader transceiver has received its attempted communication based on subsequent interrogation signals.

18. A method of identifying tags within a target area using a communication signal having a plurality of portions, each portion being of a substantially continuous first duration representing a first value or of a substantially continuous extended duration representing a second value, such that the portion has two possible formats in the form of pulses having different durations, each tag being allocated an identification word comprising a predetermined number of bits, the method comprising the steps of:

(a) transmitting from a transmitter the communication signal comprising a plurality of portions, each portion being associated with a predetermined bit of the identification word;

(b) receiving a portion of the signal at a tag and, if the identification word of the tag has said first value at the respective bit and if the tag is not deactivated, modulating the portion of the signal at the tag;

(c) monitoring at the transmitter the signal for modulation and, (c1) if modulation is detected, recording the presence of at least one tag having the first value at the respective bit, not transmitting the communication signal portion for the extended duration such that the communication signal portion has the format with shorter pulse duration, and proceeding to step (f);

(c2) if no modulation is detected during the first duration, continuing the transmission of the first communication signal portion for the extended duration such that the communication signal portion has the format with longer pulse duration;

(d) receiving the signal at a tag during the extended duration and, if the identification word of the tag has the second value at the respective bit and if the tag is not deactivated, modulating the associated portion of the signal at the tag;

(e) monitoring at the transmitter the communication signal for modulation and, (e1) if modulation is detected during the extended duration, recording the presence of at least one tag having the second value at the respective bit and proceeding to step (g), (e2) if no modulation is detected during the extended duration, indicating that no tag is present in the target area;

(f) deactivating tags having the second value at the respective bit which do not receive an extended communication signal portion;

(g) if a communication signal for each bit of the identification word has been transmitted, indicating the presence of a tag having an identification word corresponding to the combination of recorded bit values, otherwise proceeding to step (a) for the next signal portion bit.

19. A method according to claim 18, further comprising the step of transmitting a reactivation signal from the transmitter, tags having been deactivated in step (f) receiving the signal reactivating themselves to thereby receive further communication signals.

20. A method according to claim 18, whereby a tag having each bit of its identification word transmitted is configured to accept read/write commands, the method further comprising the step (h) of reading from and/or writing to the tag by transmitting signals from the transmitter.

21. A method according to claim 20, further comprising the step of deactivating the tag after the reading and/or writing is completed.

22. A computer-readable memory having series of computer executable instructions for executing the method steps of the method of claim 18.

23. A computer-readable memory having a series of computer executable instructions for executing the method steps of the method of claim 10.

* * * * *